3,312,543
HEAVY SEPARATION MEDIA

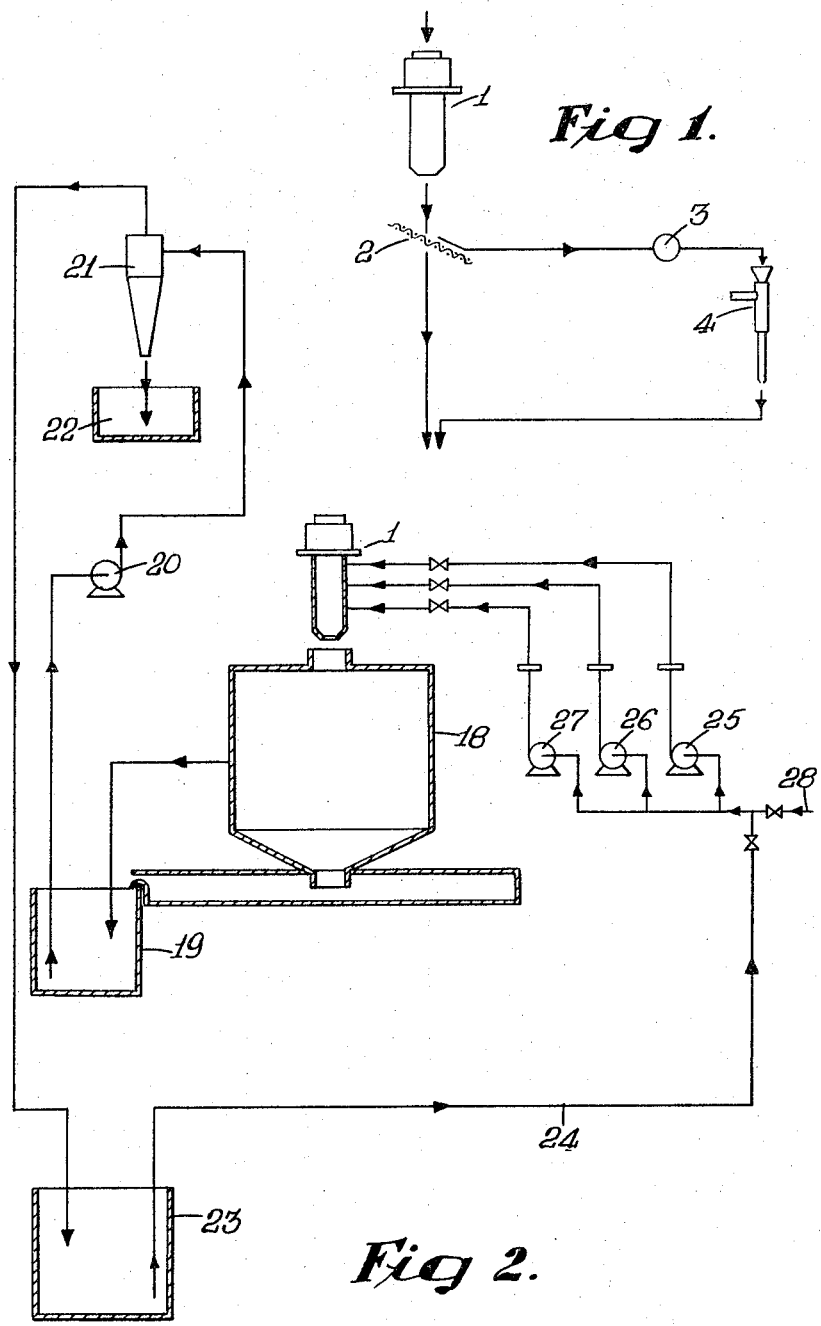

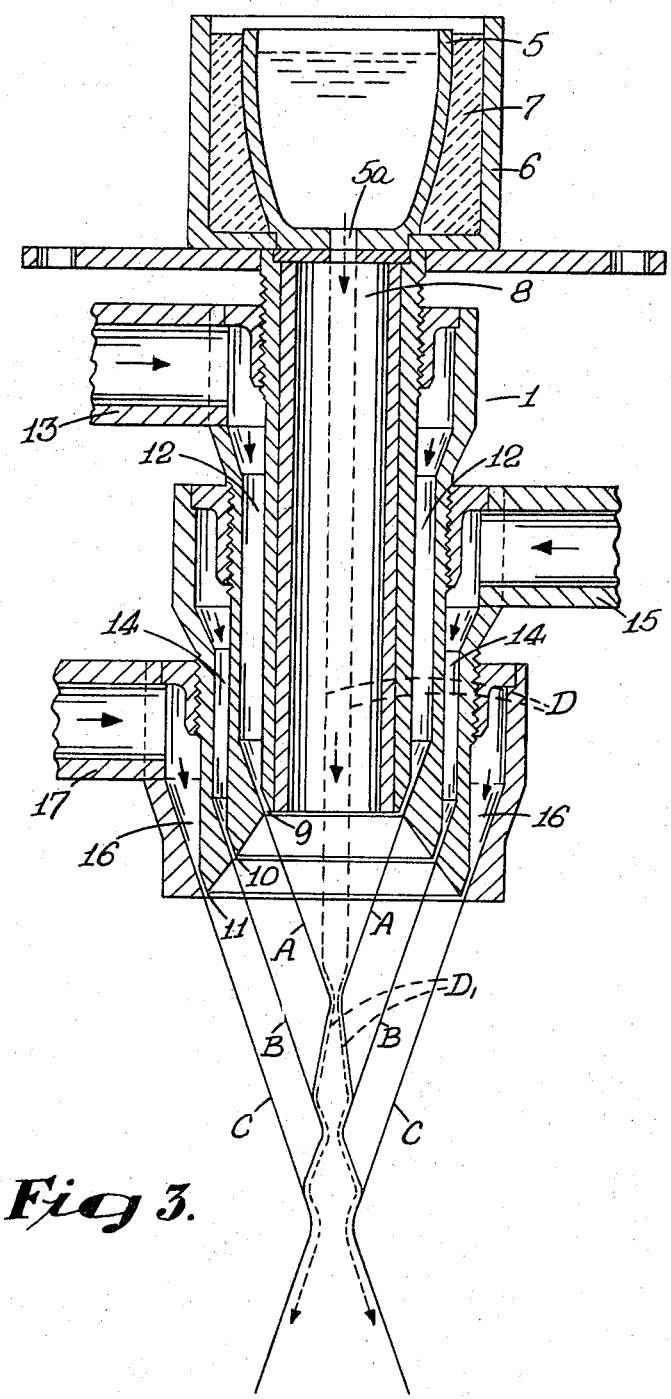

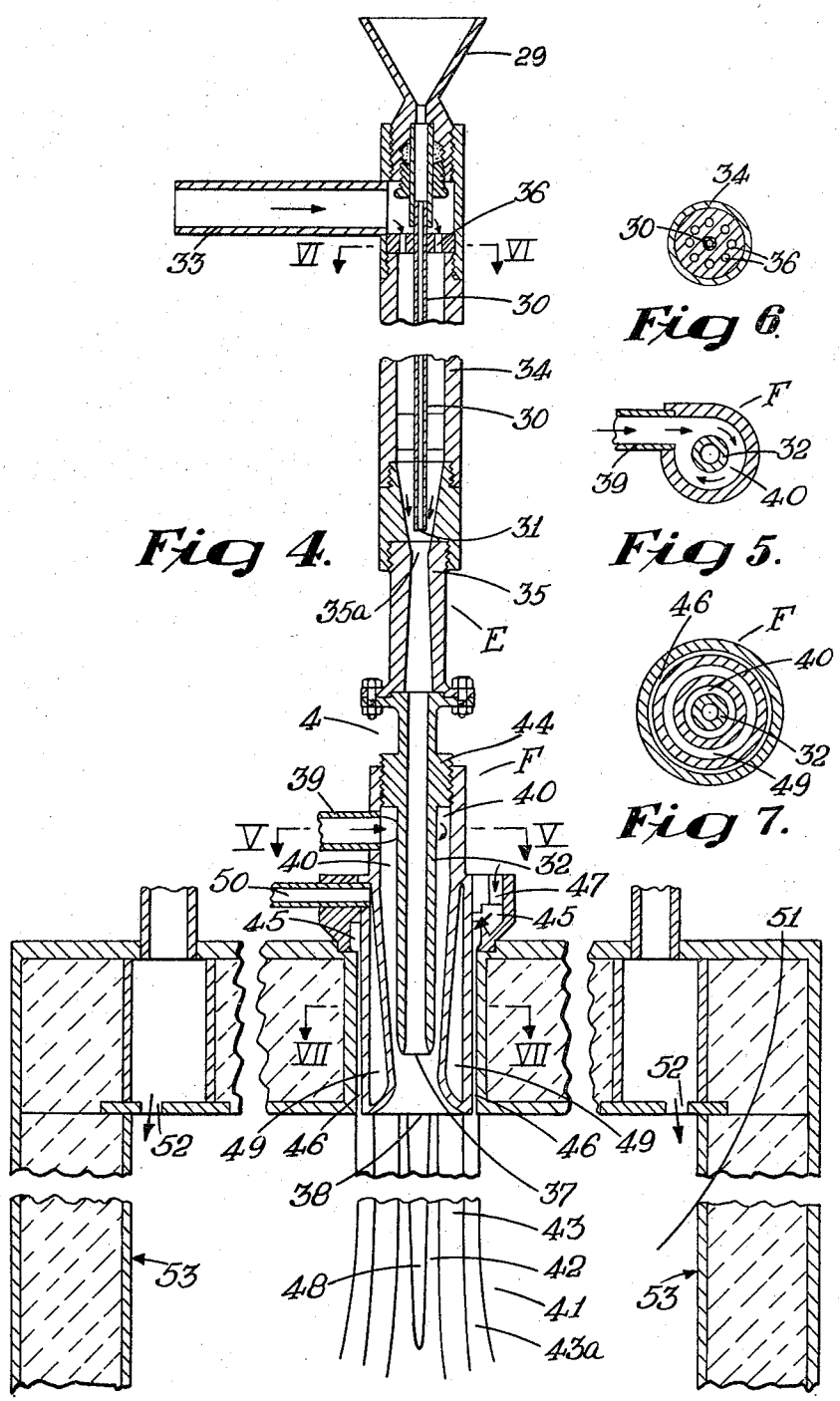

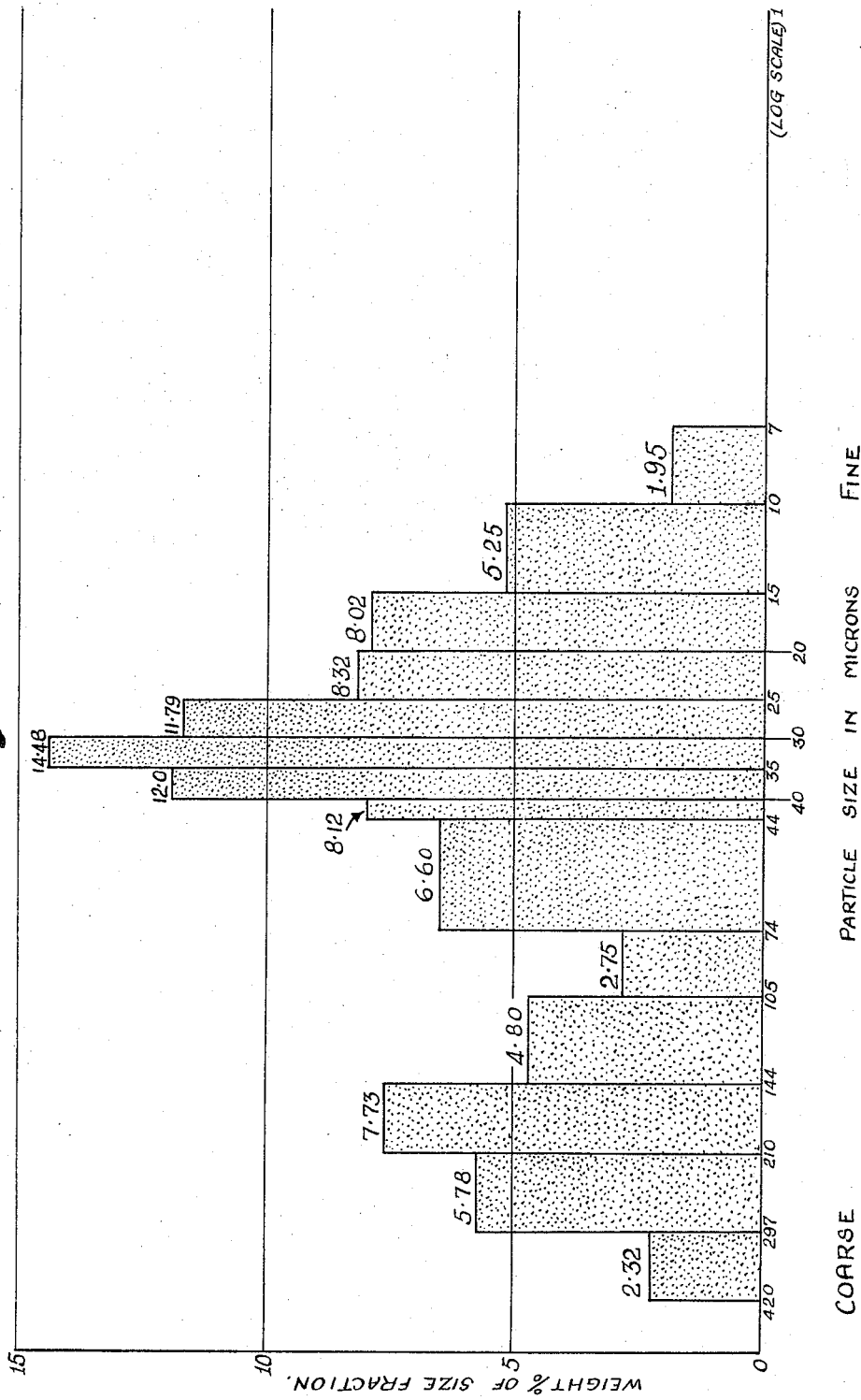

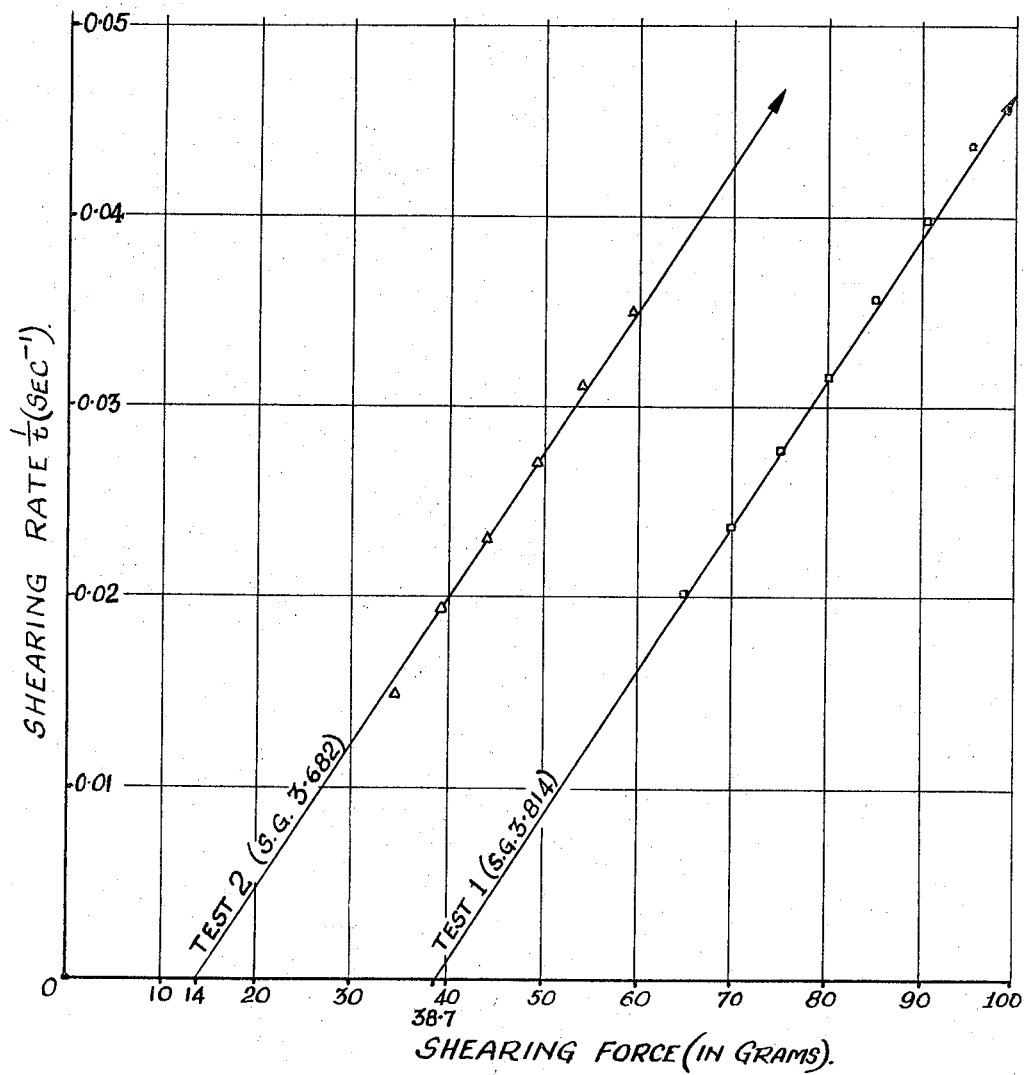

Daniel J. N. Hoffman, 12 7th St., Menlo Park, and Thomas B. Beeton, 271 Celliers St., New Muckleneuk, both of Pretoria, Transvaal, Republic of South Africa
Filed June 24, 1965, Ser. No. 480,231
Claims priority, application Republic of South Africa, Aug. 1, 1962, 62/3,265
11 Claims. (Cl. 75—0.5)

This application is a continuation-in-part of our application Ser. No. 297,634, filed July 25, 1963; now abandoned.

This invention relates to heavy separation media and particularly to solid particles for heavy media.

The suspension of solid particles in a liquid medium to produce a high density, low viscosity heavy medium for use in mineral separation, is well known. Several methods of preparing solid particles for a heavy medium are known, but hitherto most if not all such methods and/or the particles produced thereby have suffered from one or other disadvantage.

The present invention resides in a novel and economical method of preparing an advantageous blend of atomized and flame spheroidised particles in order to obtain a solid constituent having an improved size distribution for the preparation of more effective heavy medium suspensions.

The present invention further resides in the preparation of such an improved heavy medium suspension.

It has been found that for a given density a heavy medium suspension composed of rounded particles is less viscous than one composed of angular particles. However, it has been found that factors other than particle shape are also of importance.

It has been found that in heavy media the actual particle size as well as the particle size distribution of the solid particles in suspension are of utmost importance. Generally speaking, the coarser the average particle size the more fluid is the resultant suspension, but the more agitation is required to maintain suspension. Correlatively, the wider the particle size range with a given maximum particle size, the more viscous and self-sustaining is the suspension, the larger is the percentage by weight of very fine particles present and the higher is the viscosity for a given apparent density of the suspension. In other words, the wider the particle size range, the lower is the apparent density for limiting viscosity.

The ideal size distribution curve is one with a hump in the fine size range, contributing sustaining power, and another hump in the coarse range adding density without corresponding loss of fluidity.

It is known to produce solid particles of rounded shape and smooth surface by atomising molten material. It is also known to produce solid particles of rounded shape and smooth surface by flame spheroidising irregularly shaped solid particles by passing them through a high temperature flame to melt them at least at their surfaces.

Atomisation will yield particles relatively large in size and might even attain a fairly wide size range. Spheroidisation, on the other hand, is more suitable for the production of finer particles but also has a fairly wide size range. None of these processes, however, is able on its own to produce particles showing the ideal size distribution curve as defined. Simply mixing independently produced atomized and spheroidised particles will also not lead to the desired result and the distribution curve might at the most show a hump in the middle.

By the present invention the desired result is obtained.

Furthermore, when molten metal is atomized, a large proportion of the coarser particles so produced are inclined to be hollow. When used in heavy medium suspensions, such hollow particles are inclined to break down into smaller particles of irregular shape and rough surface which increase the viscosity of the suspension for a given density. This disadvantage is minimised with the present invention.

According to the invention discrete solid particles are formed by atomizing molten material. The solid particles which are rounded in shape and relatively smooth of surface, are divided, such as by screening, into a "fine" and a "coarse" fraction. The thus obtained "fine" fraction consists of particles which are regarded as coarse in heavy medium suspension, i.e. they provide the hump in the coarse range of the above-mentioned size distribution curve. Particles of the aforesaid "coarse" fraction are comminuted such as by grinding, to a size substantially smaller than the average size of the particles in the aforesaid "fine" fraction. Resultant irregularly shaped comminuted particles are flame spheroidised to produce a spheroidised fraction which are admixed with atomized particles of the "fine" fraction to produce a solid constituent. The spheroidised particles are also rounded in shape and relatively smooth of surface and provide the hump in the fine range of the distribution curve.

When the aforesaid solid constituent is added to a liquid, a relatively dense suspension with a high degree of fluidity is obtained.

The solid constituent may comprise between 40 and 85% by weight of spheroidised particles.

Preferably, the molten material which is atomized comprises a ferro-silicon alloy containing 12 to 16% by weight silicon. If required, the alloy may also contain copper, preferably not more than 3%.

Preferably also, the discrete solid particles formed by atomization are divided into a fine fraction of less than 48 mesh and a coarse fraction of greater than 48 mesh.

A preferred embodiment of the invention will now be described by way of example with reference to the accompanying drawings in which:

FIGURE 1 is a flow diagram indicating the main steps in a method according to the invention for the preparation of solid particles for a heavy medium.

FIGURE 2 is a flow diagram illustrating in greater detail the fluid atomization of molten material into discrete solid particles.

FIGURE 3 is a sectional view of a nozzle assembly suitable for fluid atomizing molten material into discrete solid particles.

FIGURE 4 is a sectional view of a downwardly directed flame-producing nozzle for flame spheroidising comminuted particles.

FIGURE 5 is a section on line V—V in FIGURE 4.
FIGURE 6 is a section on line VI—VI in FIGURE 4.
FIGURE 7 is a section on line VII—VII in FIGURE 4.
FIGURE 8 is a histogram showing the particle size distribution of a solid constituent according to the invention.

FIGURE 9 is a graph showing two plots of shearing force values against shearing rate values of a suspension in water of the solid particles of FIGURE 8.

Referring to FIGURE 1, the method consists broadly of producing a ferro-silicon alloy containing 12 to 16% by weight of silicon, in an arc or other suitable furnace (not shown) and fluid atomizing the alloy from the melt into discrete solid particles by means of nozzle assembly 1.

Atomized solid particles so produced are screened by screening means 2 to divide them into a coarse fraction and a fine fraction of above and below 48 mesh.

Particles of the +48 mesh coarse fraction are comminuted by grinding in a ball or other suitable mill 3 to a product of −270 mesh. By comminuting the +48 mesh coarse fraction of atomized particles to pass 270 mesh, the coarse fraction is reduced to irregularly shaped particles which are substantially smaller than the average size of the −48 mesh fine fraction. Comminuted particles are then flame spheroidised by means of flame-producing nozzle 4 into a spheroidised fraction which is finer than the —48 mesh fine fraction of the atomized particles obtained after screening.

Flame spheroidised particles are mixed in suitable proportion with —48 mesh fine fraction atomized particles to provide a solid constituent for a heavy medium. The proportions of atomized and flame spheroidised fractions in the solid constituent will depend on the particular application, but preferably the solid constituent should contain between 40% by weight and 85% by weight of the flame spheroidised fraction.

Referring now to FIGURE 3, atomization of the ferro-silicon alloy is effected by tapping molten alloy from the furnace (not shown) into a ladle or suitable holding furnace (not shown) for transportation to atomizing nozzle assembly 1. It may be advantageous to de-gas the alloy before atomization and this may conveniently be achieved by argon gas purging of the alloy just before atomization.

The molten metal is fed into tundish 5 which is located on top of nozzle assembly 1 and is located in insulating basket 6 containing insulating material 7. Tundish 5 is provided with teeming nozzle 5a communicating with central passage 8 of nozzle assembly 1. At the bottom of passage 8 three downwardly and inwardly facing jet nozzles 9, 10 and 11 are located in co-axial spaced relationship one below the other. Upper nozzle 9 communicates with chamber 12 having inlet 13. Central nozzle 10 communicates with chamber 14 having inlet 15. Lower nozzle 11 communicates with chamber 16 having inlet 17.

Water is introduced under pressure into chamber 12 to issue from upper nozzle 9 in the form of a hollow, inverted, conical jet indicated by lines A. Similarly water is introduced under pressure into chambers 14 and 16 to issue from central and lower nozzles 10 and 11 in the form of hollow, inverted, conical jets indicated by lines B, C respectively. The hollow conical jets are thus produced in spaced relationship one above the other. The conical jets are substantially devoid of swirling motion about their axes.

The speed at which the water jet issues from central nozzle 10 is higher than that at which the water jet issues from upper nozzle 9. Similarly, the lower water jet issues from nozzle 11 at a higher speed than the central water jet issues from nozzle 10.

Molten ferro-silicon alloy at a temperature of about 1550° C. to 1600° C. passes downwardly through teeming nozzle 5a and down central passage 8 into the open end of the upper conical jet of water as indicated by lines D. The molten metal is disintegrated and sprayed into globules. The disintegration and spraying is repeated at each successive conical jet until the metal globules solidify.

Turbulence occurs at the apex of each conical jet. When the stream of molten metal strikes the turbulent zone of the first jet A, the turbulence causes disintegration of the metal stream and tends to spray it outwardly in the form of a cone facing in opposite direction to jet A as shown by lines D1. However, before this can occur, the fluid from the first jet and metal globules formed by the first jet strike the second jet B. The fluid velocity of the second jet is higher than that of the first jet, and the fluid-metal globule mixture is pulled into the apex of the second cone where further disintegration and outward spraying occurs.

The disintegration and spraying action on the metal continues with each successive jet until the metal globules solidify.

In theory, the extent of atomization of molten metal by a fluid jet will depend on the quantity of energy transferred to the molten metal stream from the fluid jet, other things being equal. In order to transfer energy, a fluid jet must cause the metal stream to change direction as abruptly as possible, this in turn causing a shearing action on the metal. This is well accomplished by means of two or more conical jets which cause metal globules to change direction several times. It has been found that it is not essential to use three conical jets and that satisfactory results can be obtained with only two conical jets.

After passing through lower jet C of nozzle assembly 1, the resulting atomized particles drop into collecting and quenching tank 18 shown in FIGURE 2. The heavier fraction of the atomized particles will settle in tank 18 and can be removed continuously or in batches for drying. A lighter fraction of the atomized particles overflows tank 18 with water from jets A, B and C of nozzle 1, into sump 19.

Sand pump 20 conveys the light fraction and the water to hydro-cyclone 21 where the light fraction is separated and recovered in receptacle 22.

The water is discharged into reservoir 23 from where it can be drawn along line 24 by pumps 25, 26, 27 for introduction through inlets 13, 15, 17 respectively into chambers 12, 14, 16 respectively of nozzle assembly 1. Make-up water can be obtained from line 28.

The water temperature may be controlled by providing any suitable cooling means (not shown) in conjunction with reservoir 23, or by suitable adjustment of the proportions of hot water delivered by line 24 and cold water delivered by line 28.

As described above, atomized particles which are produced are screened to separate a +48 mesh coarse fraction which is comminuted to fine particles which are substantially smaller than the average size of the —48 mesh fine fraction of atomized particles.

Referring now to FIGURE 4, irregularly shaped comminuted particles of ferro-silicon alloy are fed through feed hopper 29 into particle feed pipe 30 of flame-producing nozzle 4. Outlet 31 of particle feed pipe 30 is directed towards the interior of inner discharge tube 32. Pre-heated air is introduced through inlet pipe 33 into supply tube 34 which surrounds particle feed pipe 30 and which communicates with inner discharge tube 32 through venturi tube 35.

As can be seen from FIGURE 4, outlet 31 of particle feed pipe 30 is located near the restricted zone 35a of venturi tube 35. With this arrangement, flow of air through venturi tube 35 sets up a suction effect in particle feed pipe 30, the suction effect assisting in introducing irregularly shaped particles into inner discharge tube 32. Usually, only a very small quantity of atmospheric air is inducted into particle feed pipe 30 through hopper 29, as under normal conditions feed pipe 30 carries a full load of irregularly shaped particles to be spheroidised.

Air is introduced from inlet 33 into supply tube 34 through straightening apertures 36 so that the air flows straight down supply tube 34 around particle feed pipe 30 without any substantial swirling action. It will be appreciated that irregularly shaped particles entering venturi tube 35 from particle feed pipe 30 are dispersed in air entering venturi tube 35 from supply tube 34. A mixture of pre-heated air and irregularly shaped particles is discharged from outlet 37 of inner tube 32. Outlet 37 is spaced from nozzle mouth 38.

Coke oven gas or other suitable combustible fuel gas is introduced tangentially by means of inlet pipe 39 into chamber 40 which is located concentrically around inner discharge tube 32 converges towards nozzle mouth 38. The tangential introduction of the fuel gas causes it to pass down chamber 40 around inner tube 32 with a pronounced swirling motion about the axis if inner tube 32 to induce at or near nozzle mouth 38 a swirl about the axis of inner tube 32 in the air stream issuing from inner tube 32 as well as in irregularly shaped particles dispersed in the air stream.

The air and fuel gas issuing from nozzle mouth 38 produces a pencil shaped, downwardly directed inverse flame 41 with an oxidizing zone 42 in which the highest temperature in the flame occurs, and a surrounding reducing zone 43 at least towards the periphery of flame 41. Oxidizing zone 42 is located about a cold air-containing zone 48 in which no combustion occurs. A so-called "inverse flame" is produced.

The nozzle is so shaped and the air and fuel gas introduced into the nozzle at such pressures that the air and the fuel gas are discharged at substantially similar exit velocities. This assists in maintaining a stable flame since it minimizes the formation of eddies at the interface between the air and the fuel gas. The exit velocities can be adjusted within limits by raising and lowering outlet 37 of inner discharge tube 32 in relation to nozzle mouth 38. This can be effected by adjusting the position of upper nozzle portion E relative to lower nozzle portion F by adjusting the extent to which upper portion E is screwed into lower portion F at screw-threaded engagement 44.

Irregularly shaped particles issue from nozzle mouth 38 into cold inner zone 48, and as a result of their swirling motion about the axis of inner tube 32, the particles are thrown out of inner zone 48 under the action of centrifugal force to the hot oxidizing zone 42 where they are melted at least at their surfaces before passing through reducing zone 43 and out of the flame. Since the particles pass through reducing zone 43 before leaving flame 41, too far-going oxidation of the particles is prevented.

It will be appreciated that the degree of swirl of the particles should be regulated so as to maintain the particles in the hot zone of flame 41 for an adequate period of time to permit them to be melted at least at their surfaces. It may happen that the cold inner zone 48 extends down to the bottom of flame 41. If this happens, some of the particles might miss the hot zone 42 of flame 41 by falling more or less vertically downwards, if the degree of particle swirl is too low. On the other hand, if the degree of particle swirl is too great, some of the particles will pass too rapidly through the hot zone 42 of flame 41.

The degree of particle swirl will depend on the exit velocity of combustible gas issuing from annular chamber 40. When spheroidisation commences, the degree of swirl can be adjusted as required by adjustment of the position of outlet 37 of inner discharge tube 32 in relation to nozzle mouth 38, and/or by adjustment of the pressures at which the air and fuel gas are introduced into the nozzle, to give satisfactory spheroidisation.

Nozzle 4 also includes annular chamber 45 in communication with outer annular discharge passage 46. A reducing gas, such as coke oven gas, introduced into chamber 45 through inlet 47, is discharged through outer discharge passage 46 at a velocity higher than the discharge velocity of the flame producing air and fuel gas, to form an additional envelope 43a of reducing gas which completely envelopes flame 41. The reducing envelope 43a is at a lower temperature than flame 41. The high velocity of reducing envelope 43a helps to prevent the finer particles of material undergoing spheroidising from escaping too quickly from the flame. The velocity of reducing envelope 43a may be adjusted as required by adjustment of the pressure at which the reducing gas is introduced into the nozzle, to give satisfactory spheroidisation.

As can be seen from FIGURES 4 to 7, particle feed pipe 30, supply tube 34, venturi tube 35, inner discharge pipe 32, annular chamber 40 and outer annular passage 46 are all located co-axially.

Lower nozzle portion F is cooled by means of water introduced through pipe 50 into cooling jacket 49. Further cooling jackets may be provided if necessary.

Upon pasing through flame 41, the particles to be spheroidised are melted at least at their surfaces and assume spheroidal shapes. After passing out of flame 41, the particles are allowed to cool down and solidify.

As shown in FIGURE 4, the flame-producing nozzle directs flame 41 downwardly into chamber 51 which provides a cooling zone. Annular inlet 52 is provided in the top of chamber 51 for directing a curtain of cooling medium down the inner periphery 53 of chamber 51. Cooling medium may also be introduced tangentially into chamber 51 at one or more levels along the height of chamber 51 through one or more peripheral inlets (not shown). Solidified spheroidised particles may be discharged from chamber 51 into a suitable receptacle (not shown). Further cooling means, such as, for example, a heat exchanger, may be provided.

Wet or dry cooling and collection or separation of spheroidised particles may be used as described fully in our U.S. Patent No. 3,015,852 in which the cooling chamber is referred to as a "shaft furnace" because of the flame therein.

Flame spheroidised particles obtained are mixed in required proportion with −48 mesh fine fraction atomized particles to produce a solid constituent. Preferably, the mixture contains between 40% and 85% by weight of flame spheroidised particles.

As herein above stated the flame spheroidised particles are substantially smaller in size than the average size of the −48 mesh fine fraction of atomized particles with which it is admixed.

Since the coarse +48 fraction of atomized particles is comminuted, the greater proportion if not all of atomized particles which are hollow, are broken down and flame spheroidised, thereby minimizing hollow particles in the solid constituent.

When a solid constituent according to the invention is added to a liquid, such as water, a relatively dense suspension with a high degree of fluidity is obtained.

In a specific example of the invention molten 15–16% ferro-silicon alloy was atomized in an atomizing nozzle assembly similar to that of FIGURE 3. The molten fero-silicon alloy at a temperature of about 1550° C. was passed through the teeming nozzle of the atomizing nozzle assembly and subjected to the action of two conical water jets such as A and B of FIGURE 3. The water of the upper jet issued at a temperature of 70° C. and a pressure of 300 pounds per square inch. The water of the lower jet also issued at a temperature of 70° C., but at a pressure of 450 pounds per square inch.

Discrete and solid atomized particles of round shape and relatively smooth surface were obtained and separated into a coarse fraction of +48 mesh and a fine fraction of −48 mesh. The −48 mesh fine fraction constituted 42% of the total atomized product.

Coarse +48 mesh fraction particles were comminuted to pass −270 mesh and irregularly shaped commuinuted particles were flame spheroidised in the manner described above with reference to FIGURES 4 to 7, to produce a spheroidised fraction which was finer than the average size of the −48 mesh fine fraction of atomized particles.

26.1% by weight fine fraction atomized particles were admixed with 73.9% by weight flame spheroidised particles to produce a solid constituent.

FIGURE 8 is a histogram showing the particle size distribution of the solid constituent. Particle size in microns on the horizontal axis is plotted against weight percentage of size fraction on the vertical axis. It will be seen that a peak occurs in the coarse range where 7.73% by weight of the particles fall within the size range 144–210 microns, and that another peak spaced from the first occurs in the fine range where 14.48% by weight of the particles fall within the size range 30–35 microns.

The solid constituent was suspended in water to form a heavy medium and the resultant heavy medium was used under actual operating conditions in heavy medium separating apparatus. After a two day period of operation, a test was made on the suspension and values of shearing force and shearing rate were determined in a manner well known to persons skilled in the art of heavy medium suspensions. The suspension had a specific gravity of 3.814 and comprised 86.3% by weight solid constituent and 13.7% by weight water.

It is well known to plot shearing rate against shearing force in order to obtain an indication of the viscosimetric properties of a suspension and in FIGURE 9 the curve designated "TEST 1," is a plot of the values of shearing force and shearing rate obtained from the test. Shearing force in grams on the horizontal axis is plotted against shearing rate in unit length per second on the vertical axis. The unit length was a constant dependent on the apparatus used for determining the shearing force and shearing rate values and shearing rate can therefore simply be expressed as "sec.$^{-1}$."

After a further three day period of operation, a further test was made on the suspension which had been diluted, and values of shearing force and shearing rate were obtained as before. The curve designated "TEST 2" in FIGURE 9, is a plot of the shearing force and shearing rate values so obtained. The suspension now had a specific gravity of 3.682 and comprised 82.5% by weight solid constituent and 17.5% by weight water.

It will be appreciated that many variations in detail are possible without departing from the scope of the invention as defined in the appended claims.

Instead of three jets, atomizing nozzle 1 of FIGURE 3 may have two, four or more jets. Instead of all being water jets, at least one of the jets may be a gas jet, such as a nitrogen jet. Also, at least one of the jets may comprise a mixture of liquid and gas.

Also, a small proportion of combustible gas, such as coke oven gas or producer gas, may be mixed with the oxygen containing gas discharged through inner passage 32 of flame-producing nozzle 4 of FIGURE 4, in order to improve the flame characteristics.

Any suitable cooling chamber or other suitable cooling arrangement may be provided for flame-producing nozzle 4.

Any suitable gas containing free oxygen in at least the proportion contained in air, may be discharged through inner passage 32 of flame-producing nozzle 4 of FIGURE 4. Air enriched in oxygen may be used.

It will be appreciated that any suitable atomizing and/or flame spheroidising method and means other than that described with reference to FIGURES 2 to 7 of the accompanying drawings, may be used for preparing a solid constituent according to the invention.

A ferro-silicon alloy is the preferred material for the production of a solid constituent according to the invention. A ferro-silicon alloy containing from 8 to 23%, preferably 12 to 16%, by weight Si has been found to be particularly suitable. It has also been found that copper in an amount of up to about 10%, preferably not more than 3%, by weight helps to improve particle shape of the atomized product.

However, any other suitable material, such as magnetite, may be used for the production of particles according to the invention.

We claim:

1. A method of producing a heavy medium suspension, said method comprising forming discrete solid particles by atomizing molten material, dividing the particles into a coarse fraction and a fine fraction, comminuting particles of the coarse fraction into particles substantially smaller in size than the average size of the particles in the fine fraction, passing comminuted particles through a high temperature flame to melt them at least at their surfaces to produce spheroidised particles, cooling the thus spheroidised particles, mixing spheroidised particles with fine fraction atomized particles to produce a solid constituent, and adding the solid constituent to a liquid to produce a heavy medium suspension.

2. A method as claimed in claim 1, in which the solid constituent comprises between 40% and 85% by weight of spheroidised particles.

3. A method of producing a heavy medium suspension, said method comprising forming discrete particles by fluid atomizing ferro-silicon alloy containing 12 to 16% by weight silicon, dividing the particles into a fine fraction of less than 48 mesh and a coarse fraction of greater than 48 mesh, comminuting the coarse fraction to pass 270 mesh, passing comminuted particles through a high temperature flame to melt them at least at their surfaces to produce a spheroidised fraction which is finer than the average size of said fine fraction, mixing the spheroidised fraction with the fine fraction to produce a solid constituent which contains between 40 and 85% by weight of the spheroidised fraction and adding the solid constituent to a liquid to produce a heavy medium suspension.

4. A method of producing solid particles for a heavy medium, said method comprising forming discrete solid particles by atomizing molten material, dividing the particles into a coarse fraction and a fine fraction, comminuting particles of the coarse fraction into particles substantially smaller in size than the average size of the particles in the fine fraction, passing comminuted particles through a high temperature flame to melt them at least at their surfaces to produce spheroidised particles, cooling the thus spheroidised particles, and mixing spheroidised particles with fine fraction atomized particles.

5. A method as claimed in claim 4, in which the mixture of fine fraction atomized particles and spheroidised particles contains between 40% and 85% by weight of spheroidised particles.

6. A method as claimed in claim 4 in which the molten material which is atomized comprises a ferrosilicon alloy.

7. A method as claimed in claim 4, in which the solid particles formed by atomization is divided into a fine fraction of less than 48 mesh and a coarse fraction of greater than 48 mesh.

8. A method of producing solid particles for a heavy medium including the steps of flowing a stream of molten metal from a source of supply; impinging fluid under pressure on the stream and disintegrating the molten metal; cooling the particles thus formed; dividing the cooled particles into a coarse and a fine fraction; comminuting particles of the coarse fraction into particles substantially smaller than the average size of the particles in the fine fraction; passing comminuted particles through a high temperature flame to melt them at least at their surfaces to produce spheroidised particles; cooling the thus spheroidised particles; and mixing spheroidised particles with fine fraction particles.

9. A method as claimed in claim 8, in which the mixture of spheroidised particles and fine fraction particles contains between 40% and 85% by weight of spheroidised particles.

10. A method as claimed in claim 8 in which the molten metal comprises a ferro-silicon alloy.

11. A method of producing solid particles for a heavy medium, said method comprising forming discrete solid particles by fluid atomizing ferro-silicon alloy containing 12 to 16% by weight silicon, dividing the particles into a fine fraction of less than 48 mesh, and a coarse fraction of greater than 48 mesh, comminuting the coarse fraction to pass 270 mesh, passing comminuted particles through a high temperature flame to melt them at least at their surfaces to produce a spheroidised fraction which is finer than the average size of said fine fraction, and mixing the spheroidised fraction with the fine fraction to produce a solid constituent which is between 40 and 85% by weight spheroidised fraction, both the fine fraction and the spheroidised fraction being rounded in shape and relatively smooth of surface.

(References on following page)

References Cited by the Examiner

UNITED STATES PATENTS

| | | | |
|---|---|---|---|
| 2,497,790 | 2/1950 | Pauvrasseau | 252—60 |
| 2,774,734 | 12/1956 | Rodis et al. | 75—0.5 |
| 2,878,518 | 3/1959 | Klee | 75—0.5 |
| 3,010,819 | 11/1961 | Naesar et al. | 75—0.5 |
| 3,015,852 | 1/1962 | Hoffman et al. | 75—0.5 |
| 3,021,282 | 2/1962 | Joppa | 252—60 |

OTHER REFERENCES

U.S. Bureau of Mines: Reports of Investigations No. R.I. 3469–R, May 1940, pp. 1–25, pp. relied on 14–16, 17–19, 24–25.

DAVID L. RECK, *Primary Examiner.*

N. MARKVA, W. STALLARD, *Assistant Examiners.*